United States Patent [19]

Krupp

[11] 4,260,183

[45] Apr. 7, 1981

[54] PUMP HOSE SWIVEL CONNECTION

[75] Inventor: Carroll P. Krupp, Akron, Ohio

[73] Assignee: The B.F. Goodrich Company, Akron, Ohio

[21] Appl. No.: 2,913

[22] Filed: Jan. 12, 1979

[51] Int. Cl.³ .............................................. F16L 39/04

[52] U.S. Cl. .................................... 285/134; 285/136; 285/174; 285/179; 285/276

[58] Field of Search ............... 285/134, 136, 212, 276, 285/174, 179

[56] References Cited

U.S. PATENT DOCUMENTS

| | | | |
|---|---|---|---|
| 2,293,585 | 8/1942 | Bard | 285/136 |
| 3,372,715 | 3/1968 | Ashton | 285/134 X |
| 3,990,731 | 11/1976 | Schnipke | 285/136 |
| 4,090,539 | 5/1978 | Krupp | 285/134 X |
| 4,103,938 | 8/1978 | Lasater et al. | 285/136 |

FOREIGN PATENT DOCUMENTS

| | | | |
|---|---|---|---|
| 954337 | 4/1964 | United Kingdom | 285/212 |

*Primary Examiner*—Thomas F. Callaghan

*Attorney, Agent, or Firm*—Joseph Januszkiewicz

[57] ABSTRACT

A fuel hose assembly having a swivel coupling for interconnecting the gasoline dispensing nozzle with the coaxial hose of the pump, with the swivel coupling retaining the inner and outer hose in their spaced apart positions thereby defining separate passageways while permitting the hoses to rotate relative to each other and permitting the dispensing nozzle to rotate and swivel relative to coaxial hose connection to a fuel dispensing pump.

8 Claims, 7 Drawing Figures

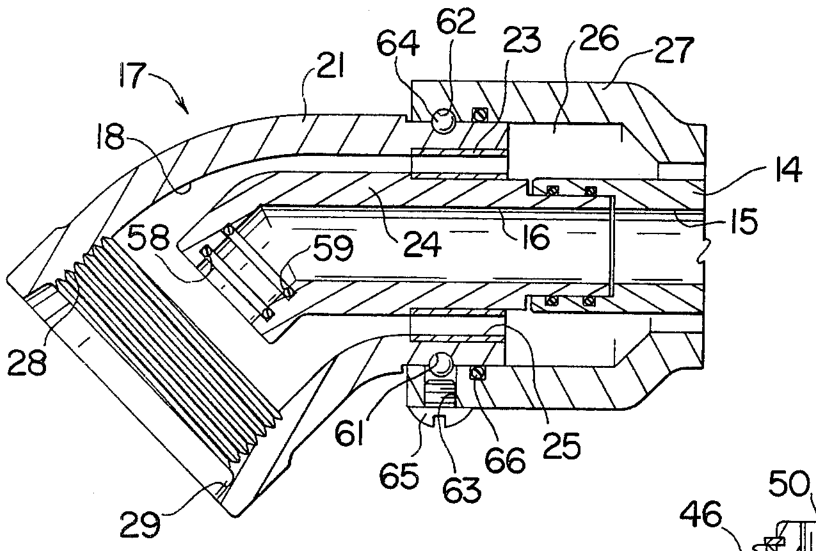
FIG. 2
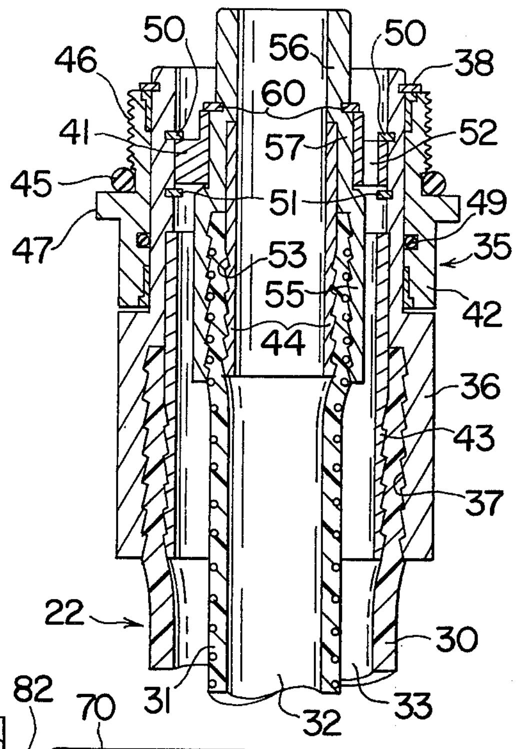
FIG. 5
FIG. 4
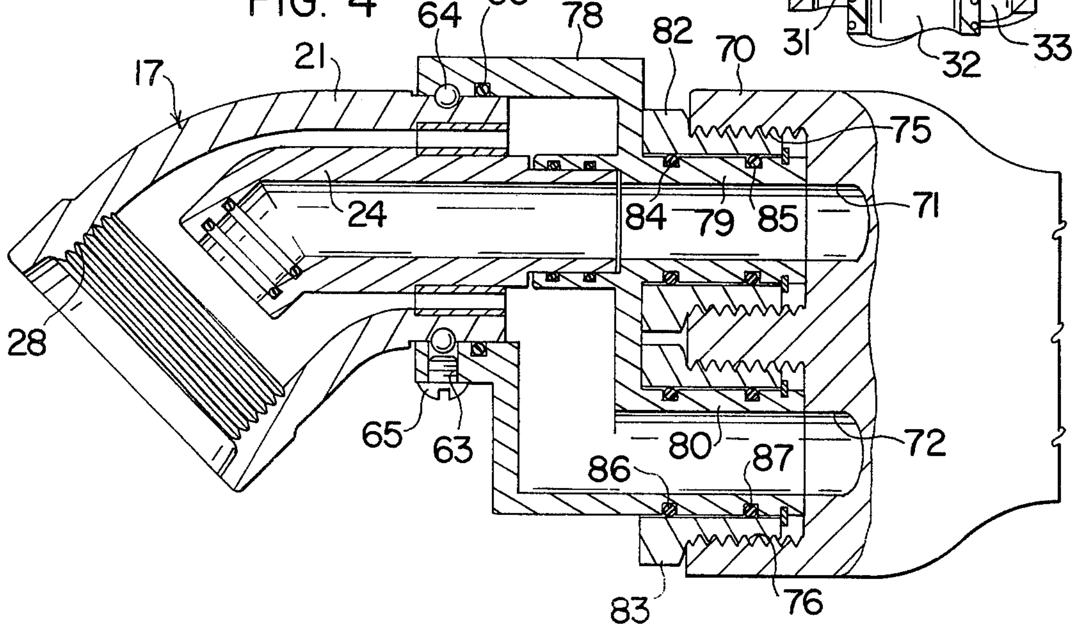

PUMP HOSE SWIVEL CONNECTION

BACKGROUND OF THE INVENTION

This invention relates to a swivel coupling and more particularly to a swivel coupling for interconnecting the gasoline dispensing nozzle with a coaxial hose which supplies the gasoline and hose to separate the fluid from the vapor lines at the gasoline dispensing pump.

It is conventional practice to store volatile hydrocarbon fuel such as gasoline at a service station in underground reservoirs from which the gasoline is pumped into the fuel tank of a customer's vehicle. As these fuel tanks are filled with gasoline, the vaporized fuel in the vehicle tank is displaced therefrom and escapes into the surrounding atmosphere. It has been found desirable from the standpoint of preventing pollution to recover and return to the underground tanks the volatile vapors of the gasoline during such filling operations. There are many newly designed pollution recovery apparatus for use in service station pumps including newly designed nozzles. In providing such systems for the recovery of vapors, it is necessary to either use two adjacent hoses or coaxial hoses to facilitate the conveyance of vapors and fuel in separate lines. This complicates the dispensing system since the hose now becomes awkward to handle due to its bulky nature. This is further complicated by the fact that certain motorists stop their vehicles at positions adjacent the pump which makes it difficult for the attendant to service the vehicle. The attendant, in trying to reach the fill opening of the tank, will twist and kink the hose. This problem is accentuated by the self dispensing pump wherein the motorists are unaware of the problems of hose twisting and further compound the kinking problem by the manner in which they handle the hose. In addition to these problems, the self serve motorist tends to impose undue stress and strain on the hose and on the end coupling to give rise to the necessity of continual hose inspections.

The present invention provides a pump end swivel for coaxial hose to maintain separate passageways for the fuel and the vapors while allowing greater flexibility to the hose and dispensing nozzle particularly under repeated use from the stowed position to its use position.

SUMMARY OF THE INVENTION

According to the present invention, a fuel hose assembly has a pair of concentric flexible hoses that are secured to swivel tubular coupling member which in turn is connected to a dispensing nozzle to permit greater movement between the coaxial hose and the gasoline dispensing nozzle. The swivel coupling member is an angularly disposed member permitting the nozzle to assume a greater latitude of movement for positioning into the fill opening of a vehicle tank without kinking the coaxial hose that extends rearwardly therefrom to the pump standard or support.

BRIEF DESCRIPTION OF THE DRAWINGS

FIG. 2 is a cross-sectional side elevational view of the swivel coupling and the one end portion of a fuel dispensing nozzle.

FIG. 4 is a cross-sectional side elevational view of the modified form of swivel coupling.

FIG. 5 is a fragmentary side elevational view of one end of a coaxial hose assembly for use with the swivel coupling and the gasoline dispensing nozzle.

DESCRIPTION OF THE PREFERRED EMBODIMENTS

Figure 1:
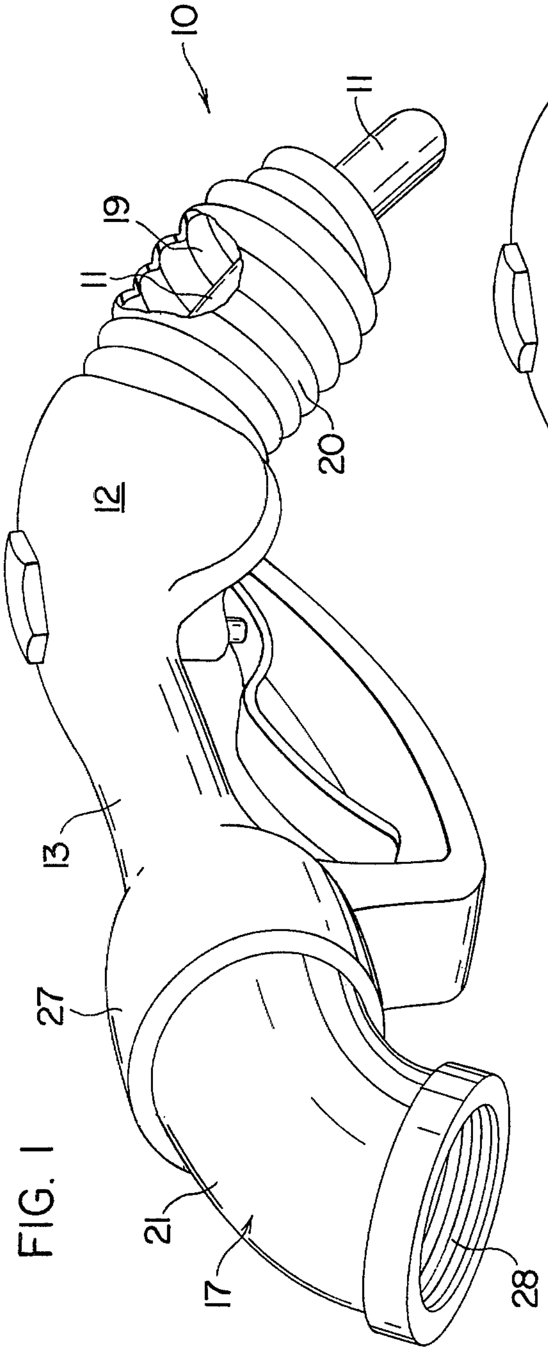
FIG. 1 is an isometric view of a gasoline or fuel dispensing nozzle and swivel coupling.

Referring to the drawings wherein like reference characters designate like or corresponding parts throughout the several views, there is shown in FIG. 1 a fuel dispensing or pump nozzle indicated generally as reference numeral 10 and includes a discharge nozzle 11. The nozzle 11 extends rearwardly and is connected to a valve housing 12. Valve housing 12 includes a tubular portion 13 which contains an inner tubular member 14 with a passageway 15 that interconnects an inner passageway 16 (FIG. 2) of swivel coupling 17 with the discharge nozzle 11, and an outer annular passageway that interconnects an outer annular passageway 18 of swivel coupling 17 with the passageway 19 formed by a resilient flexible boot or shroud 20 with the discharge nozzle 11. The flexible boot 20 is attached at its rear portion to the nozzle 11 by suitable clamp means while allowing its forward end to be free for encompassing the fuel fill opening of a vehicle to receive vapors therefrom. Reference is made to U.S. Pat. No. 4,090,539 for a more detailed description and showing of the fuel nozzle and vapor recovery system, which Patent is hereby incorporated herein by reference.

A coaxial hose or hose assembly 22 is shown in FIG. 5 and has an outer flexible conduit 30 and an inner flexible conduit 31, which conduits or hoses form a pair of concentric passages. The inner flexible conduit 31 defines a passage or passageway 32 which communicates with the inner passageway 16 of swivel coupling 17. The inner flexible conduit 31 cooperates with the outer flexible conduit 30 to define an annular passage or passageway 33 as the outer conduit 30 has an inside diameter that is greater than the outside diameter of inner flexible conduit 31. A coupling 35 connects the one end of hose assembly 22 to the gasoline dispensing means and vapor recovery means in the pedestal or standard in the services or gasoline dispensing station and similarly connects the other end of hose assembly 22 to the swivel coupling 17. Coupling 35 includes an outer tubular member 36, an inner tubular member, a spider 41 and a swivel nut 42. Outer tubular member 36 has a tubular member 43 suitably press fitted to the one end portion thereof to provide a groove 37, which receives the one end of outer flexible conduit 30. The inner periphery of groove 37, which includes the inner periphery of outer tubular member 36 and the outer end of tubular member 43, is serrated to insure a secure connection to conduit 30. The other end portion of outer member 36 has one circumferentially extending groove around the outer periphery for receiving a snap ring 38 and a pair of circumferentially extending grooves on the inner diameter thereof to receive a pair of snap rings 50 and 51. The inner tubular member of coupling 35 has a stepped outer configuration defining a large end portion 55, a small end portion 56, an intermediate portion 57 located therebetween, which intermediate portion 57 is larger in diameter than the end portion 56 but smaller in diameter than the larger end portion 55. The inner periphery of the large end portion 55 of the inner tubular member is recessed to receive a tubular member 44 that is suitably press fitted therein. Such tubular member 44 cooperates with inner periphery of large end portion 55 to define a groove 53 to receive the one end of the inner flexible conduit or hose 31. Such groove 53 which includes the inner periphery of the large end portion 55 and the outer periphery of the one end portion of tubular member 44 may be serrated to insure the connection to inner flexible conduit or hose 31. The outer end surface of the small end portion 56 may be grooved to receive a pair of o-rings 58–59 however the preferred embodiment described hereinafter has the o-rings 58–59 on the inner periphery of a mating connection to abuttingly engage the outer wall surface of the small end portion 56. The small end portion 56 is grooved adjacent to the intermediate portion 57 to receive a snap ring 60 that retains the spider 41 on the intermediate portion of the one piece inner tubular member. Spider 41 has a passage 52 to communicate the annular passageway 33 with the annular passageway 18 in the swivel coupling 17. The snap rings 50 and 51 retain outer tubular member 36 relative to the inner tubular member and permits the relative rotation of the inner flexible conduit 31 relative to the outer flexible conduit 30 and vice versa. Slidably mounted on the periphery of outer tubular member 36 is the swivel nut 42, retained therein by snap ring 38. The intermediate inner periphery of the swivel nut 42 is grooved to receive an o-ring 49 to sealingly engage the outer periphery of the outer tubular member 36. Snap ring 38 retains the swivel nut 42 on the coupling 45 but permits the relative rotation of the swivel nut 42 relative thereto so that the coupling 35 may be connected to the swivel coupling 17 and the fuel dispensing nozzle 10 yet permitting the hoses or conduits 30 and 31 to be rotated relative thereto without kinking of any of the conduits. A similar coupling 35 is connected to the other end of the pair of conduits or hoses 30 and 31 so as to facilitate their connection to the fuel pump standard or pedestal.

The swivel coupling 17 contains a curved or an arcuate shaped outer tubular member 21 with a spider 23 at one end thereof interconnected to an inner tubular member 24 which contains the inner passageway 16. Inner tubular member 24 is concentric with the outer tubular member 21 throughout, including the curved portion. The o-rings 58 and 59 are located on the inner periphery of inner tubular member 24 for sealing engagement with the small end portion 56 of inner tubular member 31 of hose assembly 22. Spider 23 has a plurality of circumferentially spaced passageways 25 to interconnect the outer annular passageway 18 of swivel coupling 17 with the annular chamber 26 of the enlarged end portion 27 of pump nozzle 10. The one end portion of coupling 17 is threaded as at 27 terminating into an outwardly extending beveled edge 29 which is adapted to abuttingly and sealingly engage o-ring 45 on the threaded end portion 46 of hose assembly 22. O-ring 45 is located in a groove between the threaded portion 46 and flanged portion 47 of hose assembly 22. The other end portion of swivel coupling 17 has a circumferentially extending groove 61 on its outer periphery that is complimentary to a circumferentially extending groove 62 on the inner periphery of enlarged end portion 27 of pump nozzle 10. A threaded bore 63 on the enlarged end portion 27 of pump nozzle 10 communicates with the grooves 61 and 62 such as to permit the receiving of ball bearings 64. Enlarged end portion 27 of pump nozzle 10 has a second circumferentially extending groove adjacent to groove 62 to receive an o-ring 66 to seal the connection between the swivel coupling 17 and the pump nozzle 10. A threaded plug 65 received by threaded bore 63 secures the swivel coupling 17 to the pump nozzle 10, thus permitting the pivoting of the gasoline dispensing nozzle and the coaxial fuel carrying hose assembly 22 relative to each other without kinking the coaxial hoses as the fuel nozzle is moved from its storage position on a pump standard or pedestal to its dispensing position into a fill pipe of a vehicle tank and back to its storage position.

Figure 3:
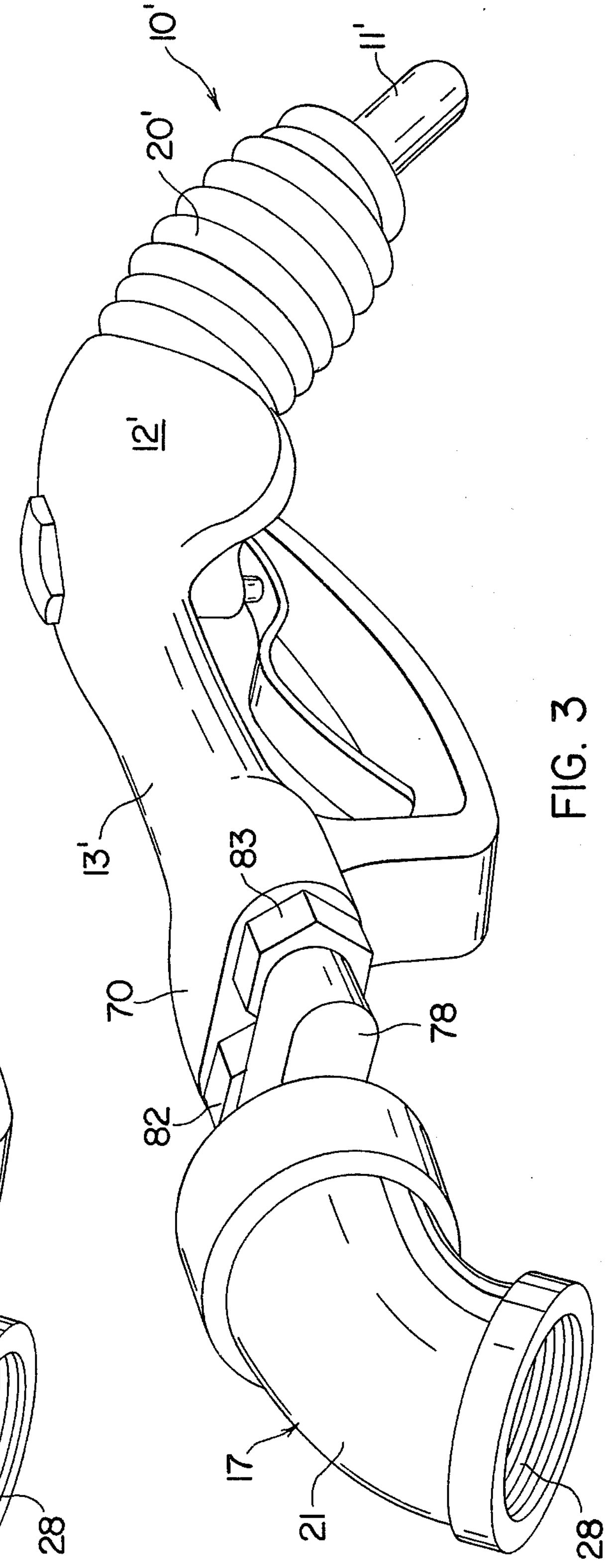
FIG. 3 is an isometric view of a modified form of a fuel dispensing nozzle and swivel coupling.

A modified form of the invention is shown in FIGS. 3 and 4 wherein the gasoline dispensing nozzle is substantially similar to that of the first described embodiment of FIG. 1 and wherein like reference parts of FIG. 3 bear the same numeral as FIG. 1 only the numerals are primed. The gasoline dispensing nozzle 10' has the nozzle 11', valve housing 12', tubular portion 13' and boot 20'. The enlarged end portion 70 of dispensing nozzle 10' is a flat oval housing, with two separate passageways 71 and 72. Passageway 72 is for the passage of vapors and communicates with the annular chamber formed by the boot 20' whereas passage 71 communicates with the fuel dispensing nozzle 11'. Passageways 71 and 72 communicate with threaded openings 75 and 76 respectively. An adapter housing 78 has a pair of outwardly extending tubular members 79 and 80 in alignment with the passageways 71 and 72 and suitably journaled thereon nuts 82 and 83 respectively. The respective outer peripheries of tubular members 79 and 80 have a pair of grooves to receive a pair of o-rings 84,85 and 86,87 respectively. The swivel coupling 17 described above fits directly into the modified dispensing nozzle 10' with the threaded plug 65 threadedly engaged into the threaded bore 63 with ball bearings 64 journaled in circumferential grooves in the adapter housing 78 and the outer tubular member 21. As in the first described embodiment, the mating portion of the nozzle housing which is the adapter housing 78 has a second circumferentially extending groove adjacent to the groove that receives the ball bearings 64 to receive the o-ring 66 to seal the connection between the swivel coupling 17 and the adapter housing 78 of the pump nozzle 10.

Figure 6:
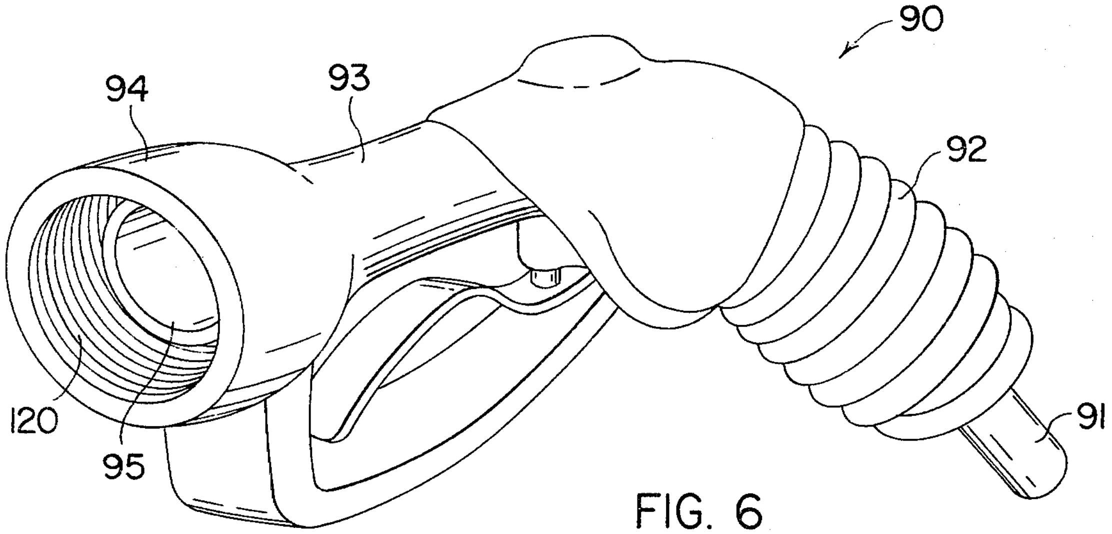
FIG. 6 is an isometric view of a modified form of a gasoline or fuel dispensing nozzle.
Figure 7:
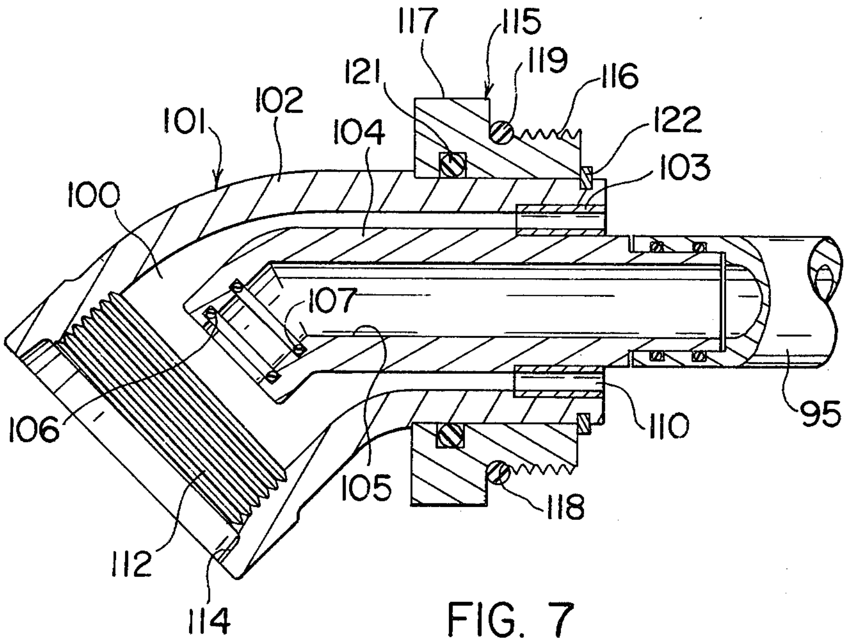
FIG. 7 is a cross-sectional side elevational view of a modified form of a swivel coupling.

A further modification of the invention is shown in FIGS. 6 and 7. FIG. 6 discloses a gasoline dispensing nozzle 90 that is substantially similar to the above described gasoline dispensing nozzle 10 and 10' with its nozzle 91, boot 92, tubular portion 93 and enlarged end portion 94. Enlarged end portion 94 has an inner tubular portion 95 which communicates with the nozzle 91 and an annular passageway formed by the enlarged end portion 94 and inner tubular portion 95 which communicates with the vapor recovery chamber formed by the shroud or boot 92 and the nozzle 91, as well as the outer annular passageway 100 of swivel coupling 101 FIG. 7. Similar to the swivel coupling 17, coupling 101 has a curved or arcuate shaped outer tubular member 102 with a spider 103 at the one end thereof interconnected to an inner tubular member 104. Inner tubular member 104 contains passageway 105 that communicates with the central passageway of inner tubular member 95 of gasoline dispensing nozzle 90 (FIG. 6). Inner tubular member 104 is concentric with the outer tubular member 102 throughout, including the curved portion. O-rings 106 and 107 are located on the inner periphery of inner tubular member 104 for sealing engagement with the inner tubular member 31 of hose assembly 22. Spider 103 has a plurality of circumferentially spaced passageways 110 to interconnect the outer annular passageway 100 of swivel coupling 101 with the annular chamber formed by the enlarged end portion 94 of pump nozzle 90 and the inner tubular member 104. As in the first embodiment, the one end portion of coupling 101 is threaded as at 112 terminating into an outwardly extending beveled edge 114 which is adapted to abuttingly and sealingly engage o-ring 45 on the threaded end portion 46 of hose assembly 22. The other end portion of swivel coupling 101 has a cylindrical member or nut 115 journaled thereon with a reduced threaded portion 116 and a hex-head 117 to facilitate the rotation of the nut 115 onto the threaded portion 120 of gasoline dispensing nozzle 90. The inner periphery of the cylindrical member 115 is grooved to receive an o-ring 121 to prevent the leakage of vapors upon its connection to the dispensing nozzle 90. The outer periphery of cylindrical member or nut 115 between enlarged hex head 117 and reduced threaded portion 116 is grooved as 118 to receive an o-ring 119 which seals the outer passageways for the vapors between annular passageway 100 of swivel coupling 101 and the vapor collection chamber formed by boot 92 on nozzle 90. Swivel coupling 101 is grooved on its outer periphery on its linear portion to receive a snap ring 122 to prevent the removal of member 115 to facilitate the attachment of swivel coupling 101 to gasoline dispensing nozzle 90.

It will be apparent that, although a specific embodiment and certain modifications of the invention have been described in detail, the invention is not limited to the specifically illustrated and described constructions since variations may be made without departing from the principles of the invention.

What is claimed is:

1. A swivel coupling for interconnecting a gasoline dispensing nozzle member with a coaxial hose comprising a pair of concentric rigid conduits, one of said conduits being an outer conduit and the other one of said conduits being an inner conduit, a spider interconnecting the one end of said conduits, said outer conduit cooperative with said inner conduits to define an annular passageway for conveying vapors from said nozzle to said coaxial hose, said spider having a plurality of circumferentially spaced passageways for communicating with said annular passageway, the other ends of said rigid conduits being formed into a pair of elbows, said elbows having the central axes of said ends of said conduits subtending an obtuse angle relative to each other, the inner periphery of said other end of said outer conduit being threaded, and means interconnecting said one end of said conduit to said gasoline dispensing nozzle member to permit relative rotation therebetween but prevent axial movement therebetween.

2. A swivel coupling as set forth in claim 1 wherein the outermost end portion of said threaded inner periphery of said other end of said outer conduit is flared smoothly outwardly for receiving an o-ring.

3. A swivel coupling as set forth in claim 2 wherein said interconnecting means includes a circumferential groove in the outer periphery of said one end of said outer conduit and a complimentary groove in the inner periphery of said nozzle member, bearing means disposed in said grooves operative to facilitate rotation between said coupling and said nozzle member but operative to prevent linear movement therebetween, a threaded bore in said nozzle member communicating with said groove in said nozzle member, and a threaded member disposed in said threaded bore to retain said bearings in said grooves.

4. A swivel coupling as set forth in claim 3 wherein said bearing means are a plurality of spherical bearings.

5. A swivel coupling as set forth in claim 4 wherein said one end of said inner conduit has a reduced outer periphery for complimentary engaging an inner conduit on said dispensing nozzle.

6. A swivel coupling as set forth in claim 1 wherein said one end of said inner conduit has a reduced outer periphery, said interconnecting means includes an adapter, said adapter having a pair of outwardly extending tubular members, one of said tubular members having its inner periphery recessed to receive said reduced one end of said inner conduit, the other one of said tubular members communicating with said annular passageway through said passageways of said spider, and said other one of said tubular members having its central axis parallel to the central axis of said one tubular member.

7. A swivel coupling as set forth in claim 6 wherein each of said pair of tubular members has a threaded nut rotatably journaled thereon for connecting said swivel coupling to said dispensing nozzle.

8. A swivel coupling for interconnecting a gasoline dispensing nozzle member with a coaxial hose as set forth in claim 1 wherein said one end of said outer conduit has a rotatably nut journaled thereon, said nut having a circumferentially extending groove on the inner periphery thereof, an o-ring mounted in said groove frictionally engaging the outer peripheral surface of said outer conduit, and an externally threaded reduced end portion on said nut for threadedly engaging said nozzle member.

* * * * *